Oct. 26, 1965   J. S. SMATKO   3,214,296
RECHARGEABLE BATTERY CELLS
Filed Feb. 10, 1964   2 Sheets-Sheet 1
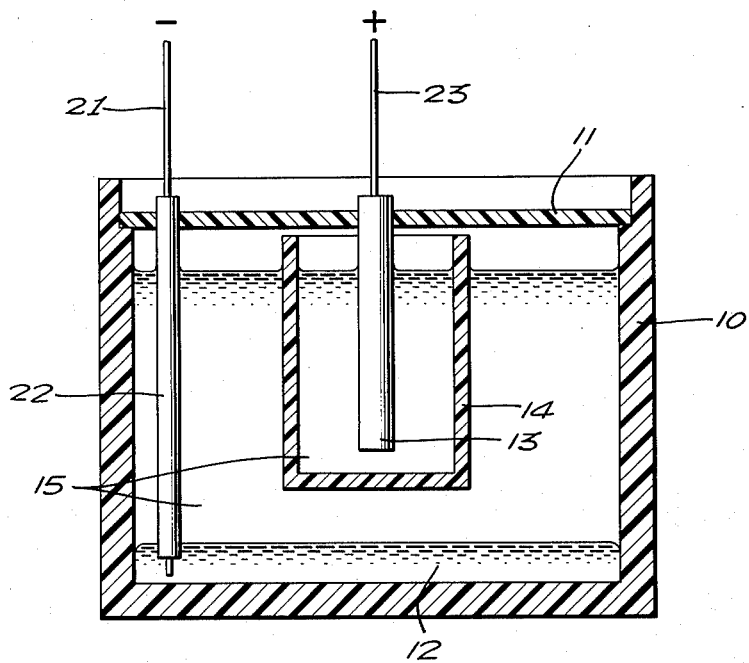
FIG. I.
JOSEPH S. SMATKO
INVENTOR.
BY
ATTORNEY

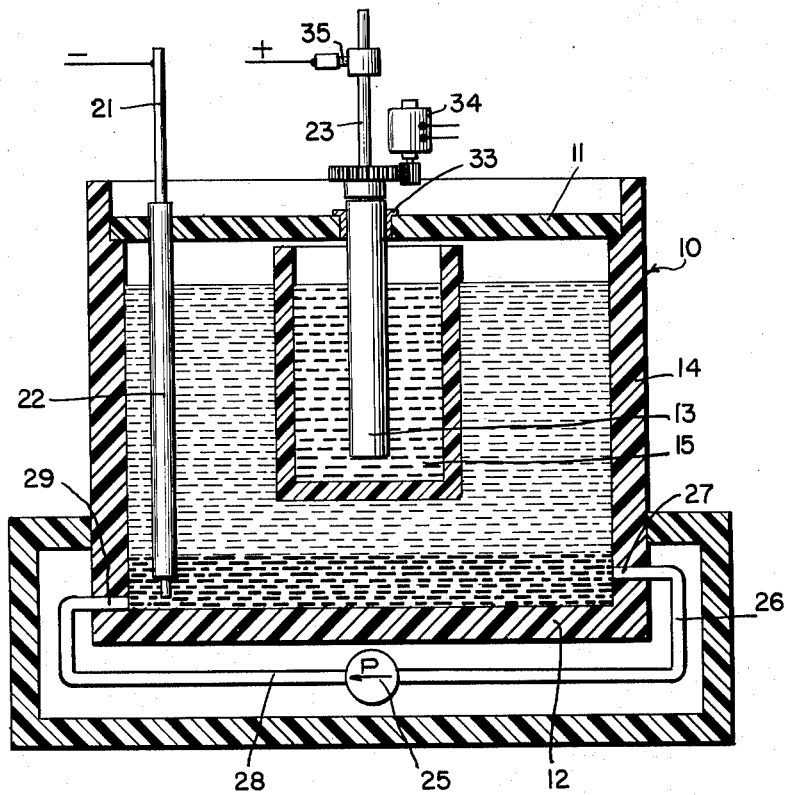
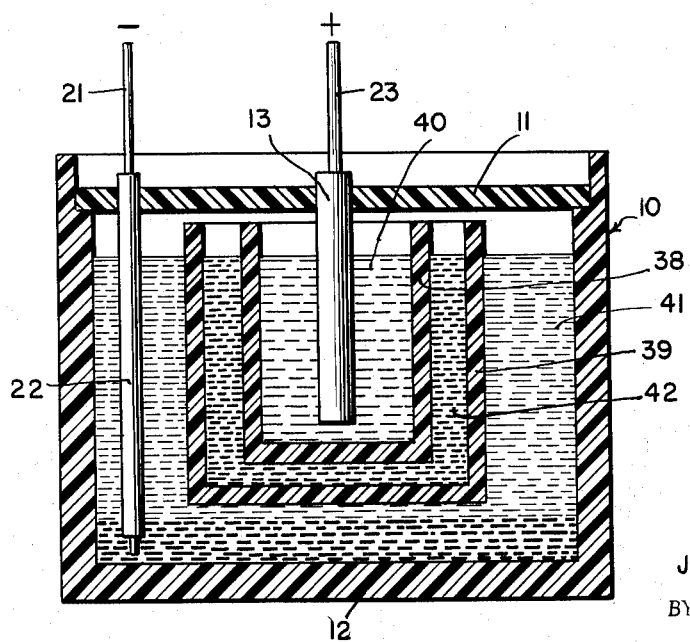

United States Patent Office 3,214,296
Patented Oct. 26, 1965

3,214,296
RECHARGEABLE BATTERY CELLS
Joseph S. Smatko, Santa Barbara, Calif., assignor to Hoffman Electronics Corporation, El Monte, Calif., a corporation of California
Filed Feb. 10, 1964, Ser. No. 344,169
16 Claims. (Cl. 136—6)

This application is a continuation-in-part of my co-pending application Serial No. 822,133, now abandoned, filed June 22, 1959 for Battery Cells.

The present invention relates to battery cells, and more particularly to battery cells in which one of the electrodes is a liquid metal.

A satisfactory battery cell capable of accommodating large power drains, such as one hundred to one thousand amperes per square foot of total electrode surface, for short periods of time, such as one-second bursts, or even substantially larger current densities than 1000 amperes for a fraction of a millisecond, and capable of accommodating substantial power drains, such as fifty amperes per square foot, for moderate periods of time, such as ten to fifteen minutes, would have many uses and is very desirable.

It is an object of the present invention, therefore, to provide a novel battery cell.

It is another object of the present invention to provide a battery cell capable of accommodating large energy drains for short periods of time and substantial energy drains for moderate periods of time.

According to one embodiment of the present invention, a battery cell comprises a liquid metallic anode, an alkali metal halide electrolyte, a cathode that is nonreactive with halogens, and a diaphragm separating the anode and cathode. The diaphragm is permeable to ionic transfer and may be of any electrically nonconductive material that is chemically nonreactive with the components of the cell.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a cross-sectional view of a battery cell according to a first embodiment of the present invention;
FIGURE 2 is a cross-sectional view of a battery cell according to a second embodiment of the present invention; and
FIGURE 3 is a cross-sectional view of a battery cell according to a third embodiment of the present invention.

Referring now to the drawings, FIGURE 1 shows a chamber 10 fitted with a cover 11 and containing mercury anode 12 and carbon cathode 13. Throughout the specification and claims, the term anode, in keeping with recognized practice, denotes the electrode at which current enters the cell, and the term cathode denotes the electrode at which current leaves the cell, when the cell is acting as a battery, that is, when it is delivering current to a load. Anode 12 lies on the bottom of chamber 11 and can be of any pure metal or alloy that is liquid at the operating temperature, mercury being preferred for this use.

Cathode 13 can be made of carbon, platinum, iridium, or any electrically conductive material that is nonreactive with the electrolytic solution in which it is immersed. Diaphragm 14, separating cathode 13 from anode 12, is of any electrically nonconductive material that is chemically nonreactive with the components of the cell. Diaphragm 14 must be permeable to the anions and cations in the electrolytic solution but substantially impermeable to their corresponding molecules. If the diaphragm is not electrically nonconductive (i.e., in the electronic sense) it will form the equivalent of a short circuit and impair operation of the cell. It will also function as a bipolar electrode and thereby destroy the function of the diaphragm.

Electrolyte 15 may be a solution having anions selected from the group consisting of bromine and iodine, and cations selected from the group consisting of alkali metals such as sodium, potassium, lithium, rubidium or cesium and alkaline earth metals such as barium, calcium or strontium. As can be seen from FIGURE 1 the electrolyte 15 is present between anode 12 and cathode 13 on both sides of diaphragm 14. A preferred example of a suitable electrolytic solution is sodium bromide. When this solution is used the diaphragm must be permeable to sodium ($Na^+$) ions and bromine ($Br^-$) ions but substantially impermeable to molecular bromine ($Br_2$). Anode 12 is coupled to an external lead 21, which is insulated from electrolyte 15 by insulation 22. Cathode 13 is coupled to an external lead 23.

To charge the battery cell shown in FIGURE 1, the positive pole of an external voltage source is coupled to the lead 23 while the negative pole is connected to lead 21. During this charging stage, anode 12 is properly called the anode. At cathode 13 the following reaction takes place: $2Br^- \rightarrow Br_2 + 2e$. At anode 12, the following reaction takes place: $Na^+ + 1e \rightarrow Na$. Thus, bromine is formed at cathode 13, while metallic sodium is formed at anode 12. The bromine dissolves in the sodium bromide solution and hovers about the carbon electrode, and the metallic sodium dissolves in the mercury. The bottom of diaphragm 14 can be made nonporous by glazing or impregnation to prevent passage of liquid bromine if any should be formed. Cover 11 should contain air vents to prevent gas pressure build-up.

When the battery cell shown in FIGURE 1 is discharging, anode 12 is properly called the anode and cathode 13 is properly called the cathode. At cathode 13 the following reaction takes place: $Br_2 + 2e \rightarrow 2Br^-$. At anode 12 the following reaction takes place: $Na \rightarrow Na^+ + 1e$. Thus, during discharge the bromine and metallic sodium each ionize, resulting in the formation of sodium bromide. The result is a battery cell capable of large energy drains for short periods of time and substantial energy drains for moderate periods of time.

Referring now to FIGURE 2, there is shown a second embodiment of the present invention. In this embodiment of the invention, means are provided for circulating the mercury anode and the catholyte contained within the diaphragm 14. In this figure, the same reference numerals used in FIGURE 1 are applied to the same elements. As shown, the mercury anode 12 is caused to circulate by a pump 25. A conduit 26 extends through a suitable opening 27 formed in the wall of the chamber 10 and is connected to the inlet of pump 25. The opening 27 is preferably positioned so that its level is equal to or slightly below the level of the top of the mercury pool. A second conduit 28 is connected to the outlet of the pump 25 and extends through an opening 29 formed in the chamber 10. The opening 29 is preferably positioned at the bottom of the mercury pool so that maximum circulation is obtained.

The catholyte is caused to be circulated or agitated by rotation of the cathode 13. For this purpose, the cathode 13 is journaled in a bearing positioned in a suitable bore 33 formed in the cover 11. The cathode 13 may be driven in any suitable fashion as by the motor 34. A brush 35 is provided so that an electrical connection may be made to the cathode 13. The circulation of the mercury anode results in more surface area being exposed to the sodium with a consequent increase in electrical capacity per unit weight or cell volume. A similar increase in capacity results from agitating the catholyte and thus exposing more of the bromine solution to the cathode. Preferably anode and catholyte circulation takes place during both the charge and discharge cycles.

Turning now to FIGURE 3, a third embodiment of the invention is illustrated. In this embodiment, the single diaphragm 14 has been replaced by two spaced diaphragms 38 and 39. This construction permits different solutions to be used as catholyte and anolyte and enables the potential difference between the electrodes to be spread so that a greater voltage output is obtained. The different solutions also can be chosen to minimize self discharge of the cell. As one example of such a cell, the body of electrolyte 40 positioned about the cathode 23 may be hydrobromic acid or acidified sodium bromide and the body of electrolyte 41 positioned in contact with the anode 12 may be sodium or potassium hydroxide, the two electrolytes being separated by a neutral solution 42 of sodium bromide positioned between the diaphragms 38 and 39. The diaphragm 38 must be permeable to the bromine anions while the membrane 39 must be permeable to the sodium cations. Diaphragms that are suitable for this cell are the Nepton AR–111–A for use as the diaphragm 38 and the Nepton CR–61 for use as the diaphragm 39. Both of these diaphragms are available from Ionics, Incorporated of Cambridge, Massachusetts.

In some cases it is desirable to provide a battery cell with a predetermined voltage characteristic upon charge or discharge. This can be accomplished by selectively controlling the movement of cations and anions from one to the other of the different bodies of electrolytic solution discussed in connection with FIGURE 3. Instead of using two diaphragms, only one is used. If it is desired to operate so that only cations migrate, a single cation permeable diaphragm such as the Nepton CR–61 may be used. Conversely, if it is desired to operate so that only anions migrate, a single anion permeable diaphragm such as the Nepton AR–111–A may be used.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A battery cell comprising: a liquid metallic anode; a first body of an electrolytic solution having a cation selected from the group consisting of alkali metals and alkaline earth metals, said first body being in contact with said anode; a second body of an electrolytic solution having an anion selected from the group consisting of bromine and iodine; means separating said first and second bodies of solution, said means including a diaphragm, said diaphragm being permeable to said anions and cations but substantially impermeable to molecular bromine and iodine; and a cathode immersed in said second body of solution, said cathode being nonreactive with said anion.

2. A battery cell comprising: a chamber; a body of mercury disposed on the bottom of said chamber and serving as a first electrode for said cell; a first body of an electrolytic solution having a cation selected from the group consisting of alkali metals and alkaline earth metals, said first body being in contact with said body of mercury; a second body of an electrolytic solution having an anion selected from the group consisting of bromine and iodine; means separating said first and second bodies of solution, said means including a diaphragm, said diaphragm being permeable to said anions and cations but substantially impermeable to molecular bromine and iodine; a second electrode immersed in said second body of solution, said second electrode being nonreactive with said anion; and a lead extending from outside the cell through said solution and into said body of mercury, said lead being provided with insulation over the portion thereof in contact with said solution.

3. A battery cell comprising: a liquid metallic anode; an electrolytic solution having a cation selected from the group consisting of alkali metals and alkaline earth metals and an anion selected from the group consisting of bromine and iodine; a cathode that is nonreactive with said anion disposed in said solution; and a diaphragm disposed in said solution between said anode and said cathode and spaced therefrom, said diaphragm being permeable to said anions and cations but substantially impermeable to molecular bromine and iodine, electrically nonconductive, and chemically nonreactive with the other components of the cell.

4. A battery cell comprising: a chamber; a body of mercury disposed on the bottom of said chamber and serving as a first electrode for said cell; an electrolytic solution disposed in said chamber over said body of mercury, said electrolytic solution having a cation selected from the group consisting of alkali metals and alkaline earth metals and an anion selected from the group consisting of bromine and iodine; a second electrode that is nonreactive with said anion disposed in said solution; a diaphragm disposed in said solution between said electrodes and spaced therefrom, said diaphragm being permeable to said anions and cations but substantially impermeable to molecular bromine and iodine, electrically nonconductive, and chemically nonreactive with the other components of the cell; and a lead extending from outside the cell through said solution and into said body of mercury, said lead being provided with insulation over the portion thereof in contact with said solution.

5. A battery cell comprising: a chamber; a body of mercury disposed in said chamber and serving as a first electrode for said cell; a body of carbon disposed in said chamber above said body of mercury and serving as a second electrode for said cell; a diaphragm disposed in said chamber between said electrodes and spaced therefrom; first and second bodies of sodium bromide electrolyte positioned on either side of said diaphragm in contact therewith and with said electrodes; said diaphragm being permeable to sodium and bromine ions, substantially impermeable to nonionic bromine and metallic sodium, electrically nonconductive, and chemically nonreactive with the other components of the cell.

6. A battery cell comprising: a chamber; a body of mercury disposed on the bottom of said chamber and serving as a first electrode for said cell; a body of sodium bromide electrolyte disposed in said chamber over said body of mercury; a diaphragm immersed in said body of electrolyte and dividing said electrolyte into two portions; a second electrode disposed in said electrolyte on the other side of said diaphragm from said body of mercury; said diaphragm being permeable to sodium and bromine ions, substantially impermeable to nonionic bromine and metallic sodium, electrically nonconductive and chemically nonreactive with the other components of the cell; and a lead extending from outside the cell through said electrolyte and into said body of mercury, said lead being provided with insulation over the portion thereof in contact with said electrolyte.

7. The cell of claim 1 wherein means are provided for circulating said liquid metal anode.

8. The cell of claim 1 wherein means are provided for circulating said second body of electrolytic solution.

9. The cell of claim 1 wherein means are provided for circulating said liquid metallic anode and further means are provided for circulating said second body of electrolytic solution.

10. The cell of claim 2 wherein a pump is provided for circulating said body of mercury, said pump having an inlet conduit extending through said chamber and communicating with said body of mercury at a level slightly below the top thereof and an outlet conduit extending through said chamber and communicating with said body of mercury at the bottom thereof, and wherein means are provided for rotating said second electrode to circulate said second body of electrolytic solution.

11. The battery cell of claim 1 wherein said first body of electrolytic solution has an anion different from the anion of said second body of solution.

12. The battery cell of claim 1 wherein said separating means includes a second diaphragm and a third body of electrolytic solution disposed between the diaphragms.

13. The battery cell of claim 12 wherein said first body of electrolytic solution is selected from the group consisting of potassium hydroxide and sodium hydroxide, and the second body of electrolytic solution is selected from the group consisting of hydrobromic acid and acidified sodium bromide.

14. A battery cell comprising: a liquid metallic anode; a first body of an electrolytic solution having a cation selected from the group consisting of alkali metals and alkaline earth metals, said first body being in contact with said anode; a second body of an electrolytic solution having an anion selected from the group consisting of bromine and iodine; means separating said first and second bodies of solution, said means including a diaphragm, said diaphragm being permeable to at least one of said anions and cations but substantially impermeable to molecular bromine and iodine; and a cathode immersed in said second body of solution, said cathode being nonreactive with said anion.

15. A battery cell comprising: a chamber; a body of mercury disposed on the bottom of said chamber and serving as a first electrode for said cell; a first body of an electrolytic solution having a cation selected from the group consisting of alkali metals and alkaline earth metals, said first body being in contact with said body of mercury; a second body of an electrolytic solution having an anion selected from the group consisting of bromine and iodine; means separating said first and second bodies of solution, said means including a diaphragm, said diaphragm being permeable to at least one of said anions and cations but substantially impermeable to molecular bromine and iodine; and a second electrode immersed in said second body of solution, said second electrode being nonreactive with said anion.

16. The cell of claim 14 wherein said first body of electrolytic solution has an anion different from the anion of said second body of solution.

References Cited by the Examiner
UNITED STATES PATENTS

| | | | |
|---|---|---|---|
| 2,607,809 | 8/52 | Pitzer | 136—83 |
| 2,646,458 | 7/53 | Walz | 136—100 |
| 2,700,063 | 1/55 | Manecke | 136—153 X |
| 2,947,688 | 8/60 | Murphy | 136—83 X |
| 3,019,279 | 1/62 | Blue et al. | 136—103 |

WINSTON A. DOUGLAS, *Primary Examiner.*

JOHN H. MACK, *Examiner.*